(12) United States Patent
Skrzypchak et al.

(10) Patent No.: US 9,078,505 B2
(45) Date of Patent: Jul. 14, 2015

(54) METHOD OF APPLYING LUBRICATION TO LEGS OF A HAIRPIN TUBE

(71) Applicant: Brazeway, Inc., Adrian, MI (US)

(72) Inventors: David W. Skrzypchak, Adrian, MI (US); Vikas Somani, Sylvania, OH (US); Brian J. Christen, Monroe, MI (US)

(73) Assignee: Brazeway, Inc., Adrian, MI (US)

( * ) Notice: Subject to any disclaimer, the term of this patent is extended or adjusted under 35 U.S.C. 154(b) by 134 days.

(21) Appl. No.: 13/647,458

(22) Filed: Oct. 9, 2012

(65) Prior Publication Data

US 2014/0096391 A1   Apr. 10, 2014

(51) Int. Cl.
| F16N 29/00 | (2006.01) |
| A45D 8/14 | (2006.01) |
| F16N 7/32 | (2006.01) |
| F16N 21/02 | (2006.01) |
| F16N 27/00 | (2006.01) |

(52) U.S. Cl.
CPC .. *A45D 8/14* (2013.01); *F16N 7/32* (2013.01); *F16N 21/02* (2013.01); *F16N 27/00* (2013.01); *Y10T 29/49391* (2015.01)

(58) Field of Classification Search
USPC ............ 29/726, 726.5, 727, 890.03, 890.045, 29/890.046, 890.05, 890.053; 72/41, 43, 72/45
See application file for complete search history.

(56) References Cited

U.S. PATENT DOCUMENTS

| 3,827,485 | A | * | 8/1974 | Hickman et al. ............... 165/171 |
| 4,284,670 | A | * | 8/1981 | Kole ............................. 427/422 |
| 5,210,932 | A | | 5/1993 | Tokura |
| 5,540,276 | A | * | 7/1996 | Adams et al. .................. 165/151 |
| 5,644,841 | A | * | 7/1997 | Stewart et al. ............ 29/890.046 |
| 5,656,332 | A | * | 8/1997 | Saito et al. ...................... 427/178 |
| 5,819,384 | A | * | 10/1998 | Bruhl et al. ..................... 29/33 D |
| 7,073,574 | B2 | * | 7/2006 | Smithey et al. ............... 165/151 |
| 7,992,299 | B2 | * | 8/2011 | Glatz et al. ............... 29/890.053 |
| 8,074,356 | B2 | | 12/2011 | Branyon et al. |
| 2002/0148117 | A1 | * | 10/2002 | Mori et al. ............... 29/890.053 |
| 2011/0162825 | A1 | * | 7/2011 | Koch et al. ..................... 165/133 |
| 2011/0302782 | A1 | * | 12/2011 | Schmid et al. ............. 29/890.03 |
| 2012/0055014 | A1 | * | 3/2012 | Branyon et al. ............... 29/726.5 |
| 2013/0186166 | A1 | * | 7/2013 | Warren ....................... 72/370.08 |
| 2013/0306182 | A1 | | 11/2013 | Thomas et al. |
| 2014/0041227 | A1 | * | 2/2014 | Lindell et al. ............ 29/890.046 |

\* cited by examiner

*Primary Examiner* — Alexander P Taousakis
(74) *Attorney, Agent, or Firm* — Harness, Dickey & Pierce, P.L.C.

(57) ABSTRACT

A method and system for manufacturing a hairpin tube. The method includes cutting a coil of tube to provide a plurality of lengths of tubes, and bending each length of tube to form a plurality of hairpin tubes. A lubricant is then atomized with an injector nozzle, and injected into at least one open end of each hairpin tube. After lubricating the hairpin tubes, the legs of each hairpin tube are expanded.

18 Claims, 5 Drawing Sheets

METHOD OF APPLYING LUBRICATION TO LEGS OF A HAIRPIN TUBE

FIELD

The present disclosure relates to a method and apparatus for applying a lubricant to legs of a hairpin tube.

BACKGROUND

This section provides background information related to the present disclosure which is not necessarily prior art.

HVAC systems utilize aluminum or copper tubes to carry heat exchange fluid. In an evaporator or condenser of the HVAC system, the tubes may be arranged to meander back and forth in a serpentine pattern. At the bends of the serpentine pattern, a hairpin portion of the tube is present that, in general, is manufactured separately and then brazed to shorter sections of the tubes. Hairpins are expanded for proper tube to fin contact. Also, to ensure that the hairpin portion can be coupled to shorter sections of the tubes, the ends of the hairpin portions are expanded using an expansion device.

During expansion of the hairpin, a lubricant is needed to assist in the expansion process. To provide this lubricant, it is common to lubricate a coil of tube from which the hairpin portions are formed. In this regard, it is common to fill the entire master coil of tube with lubricant and then purge a majority or excess of the lubricant from the coil with compressed gas. The hairpin portions would then be cut at the appropriate length from the lubricated master coil. Alternatively, it is conventional to introduce large amounts of lubricant into the hairpin portions and then purge the lubricant from the tube using compressed gas.

These conventional methods, however, are very messy and expensive. In this regard, using these conventional methods, more lubricant than is necessary for expansion is used. By using more lubricant than is necessary, the cost associated to produce the hairpin portions is unnecessarily increased. In addition, the extra lubricant might have to be removed in a degreasing process after expansion, which also raises production costs.

What's more, the process of entirely filling the coil with lubricant is time consuming. Because of the long fill and purge times, the production capacity for a lubricating station is quite low. Due to the low production capacity of such a method, multiple lubricating stations are needed, which additionally raises the costs associated with producing the hairpin portions.

Lastly, the fill and purge process is generally dedicated to a single lubricant. More particularly, different lubricants may not be compatible with one another, and the fill and purge process generally utilizes a reservoir filled with a large amount of lubricant that is pumped from the reservoir to the tube to be expanded. Because of the incompatibility of various lubricants, the reservoir and lubricating machine must be thoroughly cleaned if a different lubricant is to be used so that no cross-contamination will occur. This is very time consuming, and not desirable.

SUMMARY

This section provides a general summary of the disclosure, and is not a comprehensive disclosure of its full scope or all of its features.

The present disclosure provides a method and system for manufacturing a hairpin tube. The method includes cutting a coil of tube to provide a plurality of lengths of tubes, and bending each length of tube to form a plurality of hairpin tubes. A lubricant is then atomized with an injector nozzle, and injected into at least one open end of each hairpin tube. After lubricating the hairpin tubes, the legs of each hairpin tube are expanded.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure provides a method and apparatus for applying a lubricant to a hairpin tube that is to be expanded. In particular, the present disclosure is directed to a method and apparatus that provides a metered atomized dose of lubricant to the hairpin tube in an automated manner. Because the dose of lubricant can be strictly controlled, the amount of lubricant required before expansion is substantially reduced, which substantially reduces the cost associated with producing the coated (lubricated) hairpin tubes. Further, although the amount of lubricant is substantially reduced, the reduced amount of lubricant does not negatively affect the expansion process. It should be understood that the present disclosure, although primarily directed to manufacture and production of hairpin tubes, should not be limited thereto. That is, the present disclosure applies to manufacture and production of any type of tube that may require expansion. Accordingly, the teachings of the present disclosure can be applied to the production of straight tubes as well as hairpin tubes.

Figure 1:
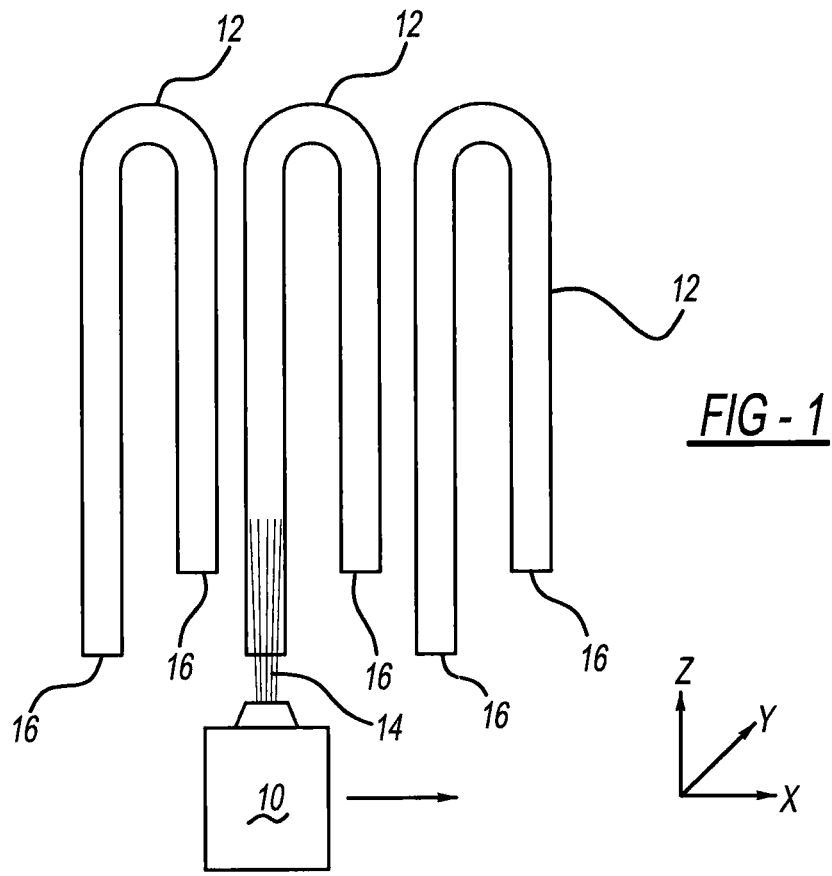
FIG. 1 is a schematic representation of an injector nozzle injecting atomized lubricant into each of a plurality of tubes.
Figure 2:
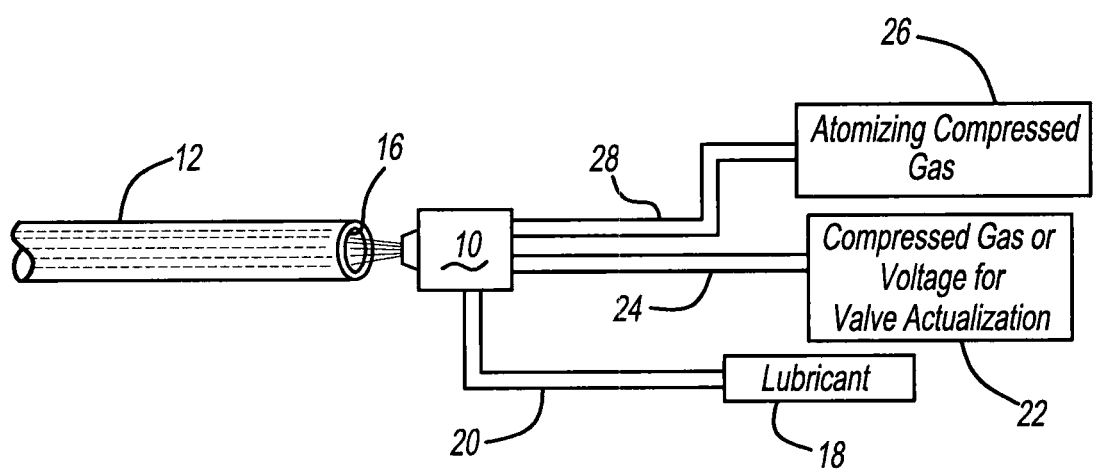
FIG. 2 is a schematic representation of an injector nozzle used in the injector apparatus according to a principal of the present disclosure.

FIGS. 1 and 2 illustrate an exemplary embodiment of injecting a metered atomized dose of lubricant into a hairpin tube. In FIG. 1, an injector nozzle 10 is operable to move (e.g., in the direction of the arrow) along a row of a plurality of hairpin tubes 12, and inject a metered atomized dose of lubricant 14 into an end 16 of hairpin tubes 12. Alternatively, hairpin tubes 12 can be placed along, for example, a conveying device (FIG. 4) and made to pass by a stationary injector nozzle 10. As hairpin tubes 12 pass the stationary injector nozzle 10, a metered dose of atomized lubricant 14 can be injected into an end 16 of hairpin tubes 12.

As illustrated in FIG. 2, injector nozzle 10 is in communication with lubricant source 18 that provides lubricant 14 through an inlet line 20 to injector nozzle 10. In addition, injector nozzle 10 is in communication with a compressed gas source 22 that provides pressurized gas through line 24 to injector nozzle 10. Compressed gas source 22 provides pressured gas through line 24 to actuate a valve (not shown) in injector nozzle 10 when dosing of lubricant 14 is needed. It should be understood that the valve (not shown) of injector nozzle 10 is not necessarily actuated by compressed gas source 22. In contrast, one skilled in the art will readily acknowledge and appreciate that injector nozzle 10 can include a mechanically actuated valve or an electrically actuated valve without departing from the scope of the present disclosure.

To atomize lubricant 14, injector nozzle 10 is also in communication with an atomizing compressed gas source 26 that provides a second pressurized gas to injector nozzle 10 through line 28. Atomizing compressed gas source 26 is operable to convert lubricant 14 into an ultra-fine, high-velocity mist of droplets that coats an inner surface of hairpin tubes 12.

During a conventional method of manufacturing hairpin tubes 12, a single coil of tube is cut and shaped using equipment that converts the tube into a plurality of hairpin tubes 12. Prior to cutting and shaping the single coil of tube, the conventional method utilizes a lubrication process where lubricant 14 was pumped from a reservoir through the entire length of the single coil of tube to lubricate the inner surface of the single coil of tube. After lubricating the single coil of tube in this manner, the conventional method also required a step of purging the lubricant from the single coil of tube. Because the single coil of tube can be hundreds or thousands of feet long, one skilled in the art will acknowledge that the steps of lubricating and purging the single coil of tube can be very time consuming. Additionally, the amount of expensive lubricant used is this process can be excessive.

The method of the present disclosure eliminates the time-consuming processes of pumping lubricant through the single coil of tube and then purging the tube of the lubricant. The method of the present disclosure, therefore, reduces the time and cost associated with manufacturing hairpin tubes 12. In this respect, hairpin tubes 12 are manufactured from the single coil of tube before lubricating the tubes for the expansion process.

Figure 3:
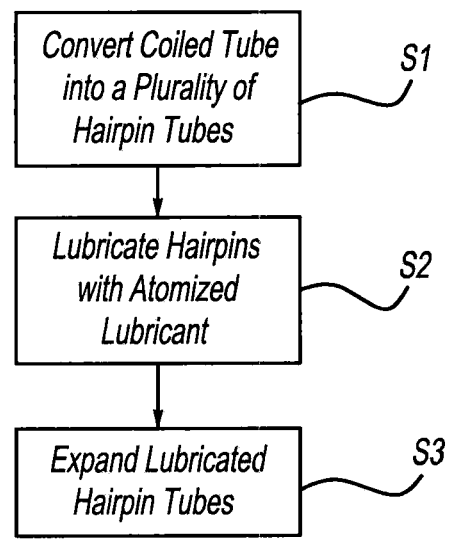
FIG. 3 is a flow chart of a method according to a principle of the present disclosure.
Figure 4:
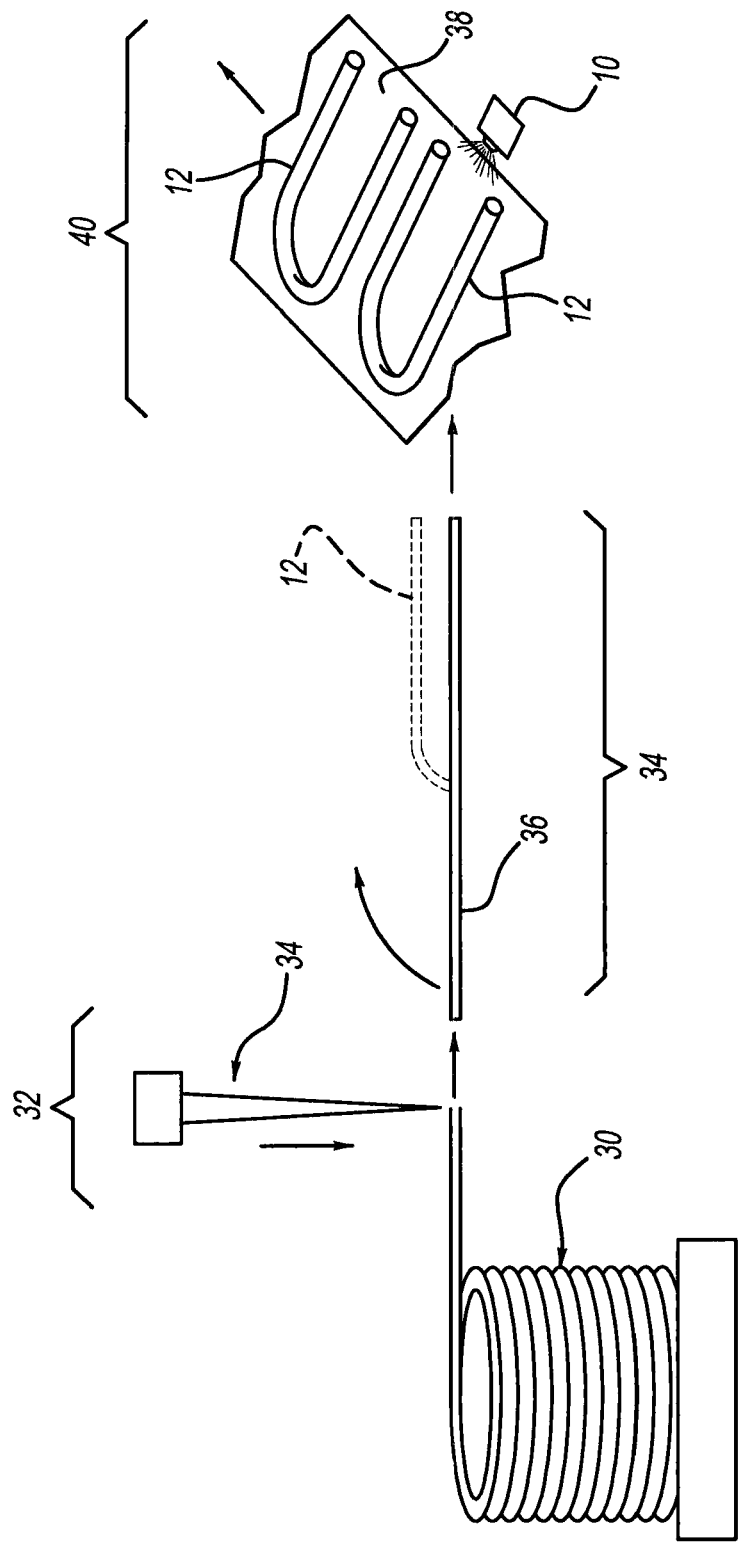
FIG. 4 is a schematic representation of a manufacturing process of a hairpin tube according to a principle of the present disclosure.

Referring to FIGS. 3 and 4, the method of the present disclosure will now be described. In a first step (S1), a single coil of tube 30 is converted into a plurality of hairpin tubes 12 by cutting and shaping the single coil of tube 30. In this regard, the manufacturing facility may utilize an assembly-line like system where a first station 32 includes a cutting device 34 for cutting the single coil tube 30 at appropriate lengths that correspond to the desired length of hairpin tube 12. At a second station 34, the cut tube 36 may be shaped or bent into the desired configuration to form the hairpin tube 12. After forming hairpin tubes 12, the hairpin tubes 12 may be fed along a conveyor device 38 at a third station 40 where a stationary or movable injector nozzle 10 can be located.

As each hairpin tube 12 passes injector nozzle 10, a metered dose of atomized lubricant 14 is injected into ends 16 of hairpin tubes 12 (S2). After hairpin tubes 12 are sufficiently lubricated using injector nozzle 10, hairpin tubes 12 are expanded during an expansion process (S3), as is known in the art. To ensure that injector nozzle 10 does not unnecessarily eject a metered dose of lubricant 14 when not aligned with an end 16 of hairpin tube 12, a sensor device (not shown) such as an optical sensor, or some other type of method, may be disposed adjacent injector nozzle 12.

In addition, in lieu of a conveyor device 38, it should be understood that hairpin tubes 12 can be manually or automatically loaded onto a cart or storage unit that can then be transferred to a location within the manufacturing facility where an automated injector nozzle 10 is located. At this location, injector nozzle 10 would be actuated along a defined path to inject a metered dose of lubricant 14 into the plurality of stationary hairpin tubes 12, without departing from the scope of the present disclosure.

It should be noted that injector nozzle 10 is preferably spaced apart from open ends 16 of tubes 12 during injection of a metered dose of lubricant 14. This is a beneficial aspect of the present disclosure in that no physical device such as a swab or wand is inserted into tubes 12 that may damage the tube 12, nor is there the chance for debris that may be present on a swab or wand to be left within side tubes 12. Furthermore, spacing the injector nozzle 10 away from tubes 12 during injection of the metered dose of lubricant provides for easier automation of injector nozzle 10. In particular, there is no need for a motor or controller that is operable to move injector nozzle 10 in and out of open ends 16 to inject the lubricant 14. Rather, injector nozzle 10 need only be movable in the x-direction in FIGS. 1 and 2, and movable in the z-direction in FIGS. 1 and 2. Notwithstanding, it should be understood that injector nozzle 10 or tubes 12 may each be moved in the x-, y-, or z-directions relative to each other without departing from the scope of the present disclosure.

Although injector nozzle 10 is spaced apart from tubes 12 during injection of the lubricant 14, injector nozzle 10 expels atomized lubricant at a force sufficient to coat tubes 12 having a length up to thirty-six inches. By expelling atomized lubricant 14 with such a force, tube 12 is ensured to be adequately coated with lubricant 14. In addition, even though tube 12 is adequately coated with lubricant 14 after injection of lubricant 14 therein, the amount of lubricant 14 that is injected by injector nozzle 10 is substantially less than that used during a conventional fill and purge method.

According to the above-noted method, a substantially reduced amount of lubricant 14 is used to lubricate hairpin tubes 12. In this regard, to properly lubricate a 450 pound coil of a ⅜ inch tube, the conventional fill and purge method uses about 0.027 pounds of lubricant per pound of tube. In contrast, the method of the present disclosure utilizing an injector nozzle 10 that administers a metered dose of atomized lubricant 14 only uses 0.003 pounds of lubricant per pound of tube. Because the method of the present disclosure uses much less lubricant as compared to the conventional fill and purge method, the cost to produce hairpin tubes 12 is substantially reduced.

In addition, it should be understood that by atomizing lubricant 14, less lubricant is used and the solvent of lubricant 14 is more readily evaporated within hairpin tubes 12. More particularly, lubricant 14 is generally a waxy oil-type lubricant including solvents such as naptha and/or acetone. When excess solvent is present in hairpin tubes 12 during expansion thereof, it is believed that an increase in resistance is experienced between the expansion device (not shown) and the hairpin tube 12. Expansion of the hairpin tubes 12 is generally needed when hairpin tubes 12 are to be used in a heat exchanger (e.g., condenser or evaporator) for, for example, a refrigeration or heat pump system. When hairpin tubes 12 are used in such a heat exchanger, tubes 12 can be expanded to provide sufficient heat exchange contact between an outer surface of tube 12 and fins (not shown) of the heat exchanger. Regardless, when an increase in resistance is experienced, the amount of expansion force required to expand hairpin tube 12 is increased. This is not desirable from the perspective that when the expansion force is increased, the risk of cracking or splitting hairpin tube 12 increases, as does the risk of damaging the expansion device.

According to the convention fill-and-purge method, excess lubricant 14 and, therefore, solvent remains in hairpin tubes 12 before expansion thereof. Because of the excess solvent that can remain in hairpin tubes 12, the risk of excessive variations in shrinkage or expansion of using the conventional fill-and-purge method is increased. That is, because the dose of lubricant 14 is metered (i.e., strictly controlled), the variation in shrinkage and expansion among tubes 12 produced during the manufacturing process can also be controlled (i.e., more strict manufacturing tolerances are obtainable). Also, excessive lubricant drips from hairpins tubes 12 can cause cleanliness and safety issues. Lastly, excessive lube requires, in some cases, more evaporative effort to offset the above-noted drawbacks of excess solvent being present in hairpin tube 12 during expansion thereof.

In contrast, according to the method of the present disclosure, the lubricant 14 is dispersed into a plurality of ultra-fine mist of atomized droplets. Because the droplets of lubricant 14 are so fine, the rate of evaporation of any solvent in lubricant 14 is increased. The decrease in solvent present in hairpin tubes 12, as noted above, decreases the risk of increased resistance during the expansion process, which results in a lower occurrence of split or broken hairpin tubes 12. As less scrap is produced, an increased cost savings is achieved.

Furthermore, because a lower expansion force may be used or required to expand hairpin tubes 12 according to the method of the present disclosure, a lower amount of shrinkage of hairpin tube 12 is experienced during the expansion process. More specifically, it should be understood that although the expansion force may be decreased according to the present disclosure, the expansion force used still utilizes eighty to three hundred pounds of force. As so much force is exerted during the expansion process, it is not uncommon for hairpin tube 12 to be compressed to an extent that hairpin tube 12 can excessively shrink (i.e., be shortened in length). The amount of shrinking experienced using the method of the present disclosure, however, is equal to or less than the conventional fill-and-purge method. As less shrinkage is experienced, the cost savings associated with using less tubing to form hairpin tubes 12 can be significant over the course of an extended period of time.

Now referring to FIGS. 5 and 6, an exemplary automated injector apparatus 42 for applying a lubricant 14 to hairpin tubes 12 will be described. Injector apparatus 42 can be used in a situation where hairpin tubes 12 are manually or automatically loaded onto a cart or storage unit that can then be transferred to a location within the manufacturing facility where automated injector apparatus 42 is located.

Injector apparatus 42 includes a pair of frame members 44, with at least one of frame members 44 being movable along rails 46. As at least one frame member 44 is movable along rails 46, different lengths of tube 12 may be supported in support slots 48 that are formed in frame members 44. Frame members 44 may be formed of materials such as steel, aluminum, or other metal materials that are sufficiently rigid and able to support tubes 12. Although metal materials are preferred, it should be understood that rigid plastic materials can be used to form frame members 44, without departing from the scope of the present disclosure. Further, although frame members 44 are illustrated as including seven slots 48 for supporting tubes 12, it should be understood that FIGS. 5 and 6 are exemplary illustrations only. That is, frame members 44 can be much larger and configured to support many more tubes 12 than that illustrated.

To provide lubricant 14 to open ends 16 of tubes 12, injector apparatus 42 includes an injector nozzle 10. Injector nozzle 10 is mounted to and movable along a track 50. To move injector 10 along track 50, track 50 may include an electric motor 52 that rotates track 50. In this regard, track 50 may be threaded, and injector nozzle 10 can be attached to a mounting block 54. An aperture 56 of mounting block 54 can have a threading that is reciprocal to a threading of track 50 such that when track 50 rotates in either a positive or negative direction, injector nozzle 10 can be translated along track 50. It should be understood, however, that injector nozzle 10 can be translated along track 50 in any manner known to one skilled in the art. For example, injector nozzle 10 may be belt-driven to move along track 50, without departing from the scope of the present disclosure.

Motor 52 may house a controller (not shown) that is operable to control rotation of track 50 and, accordingly, movement of injector nozzle 10 along track 50. In this regard, the controller may be operable to follow a control logic that takes into account the number of and distance between support slots 48 formed in frame member 44. By taking into account the number and distance between support slots 48, the controller can control motor 52 in a manner that injector nozzle 10 will be translated the appropriate distance between tubes 12 before applying a metered dose of lubricant 14 to tubes 12.

Figure 5:
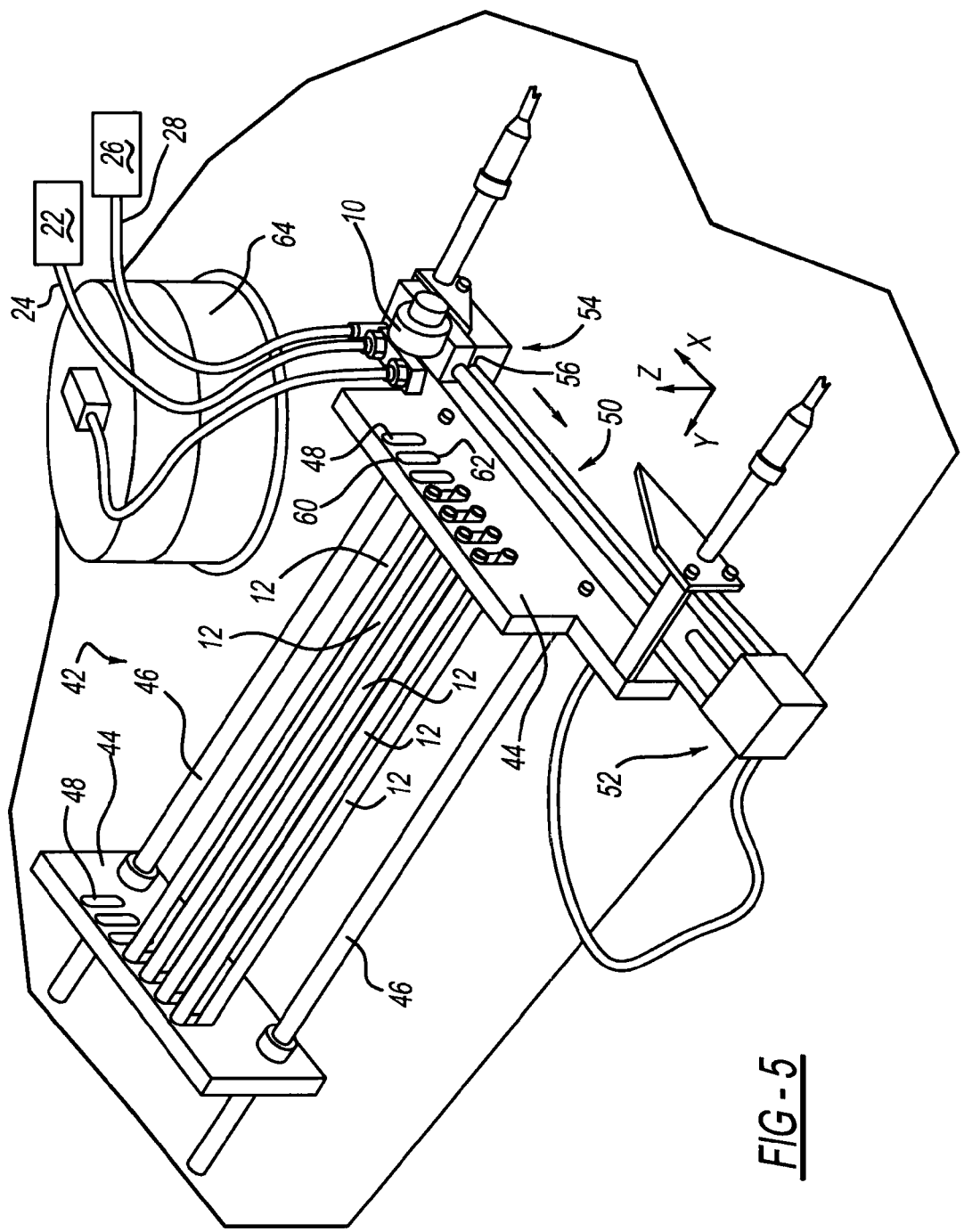
FIG. 5 is a perspective view of an injector apparatus according to a principle of the present disclosure with an injector nozzle at a first position.
Figure 6:
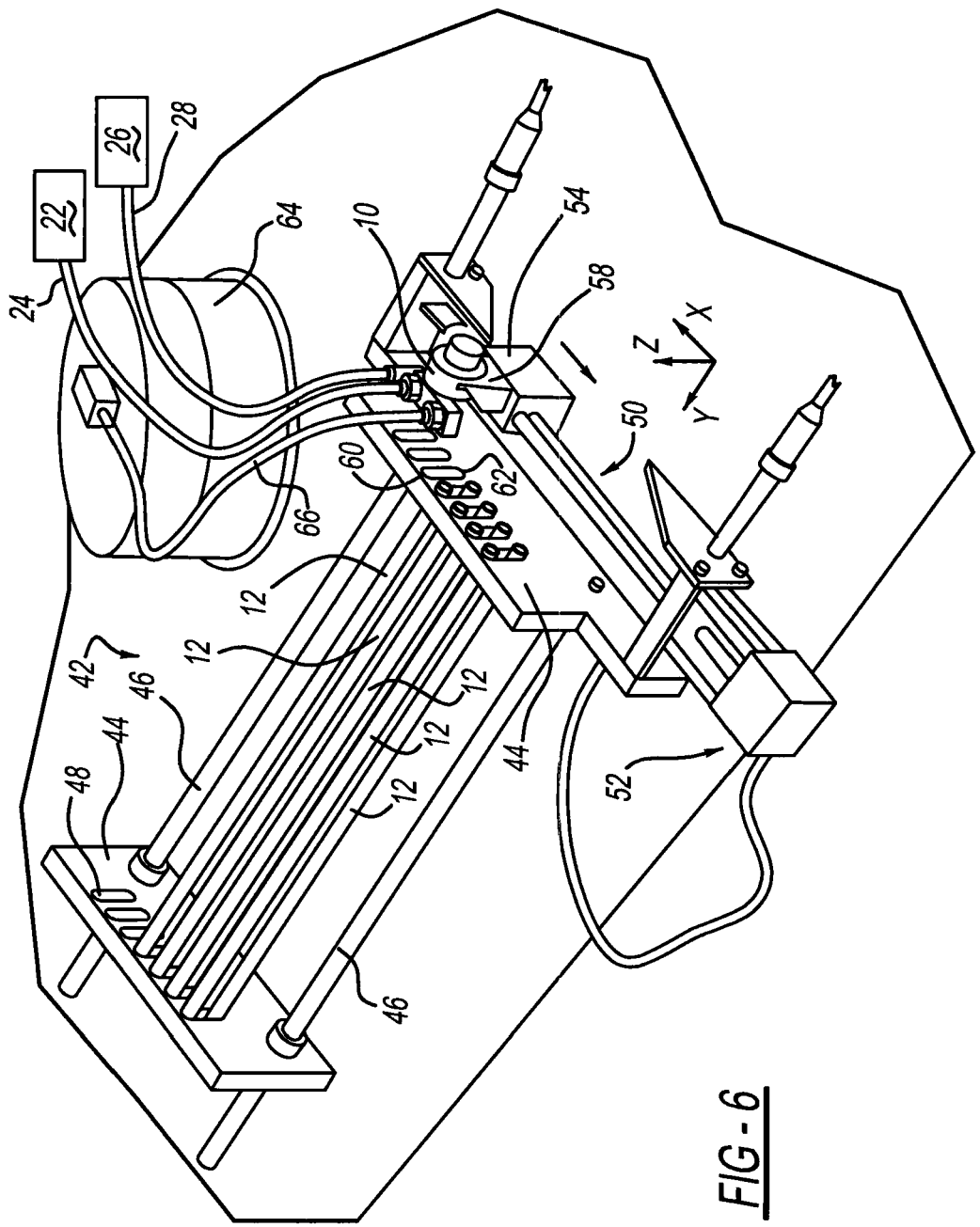
FIG. 6 is another perspective view of the injector apparatus according to a principle of the present disclosure with the injector nozzle at a second position.

As illustrated in FIG. 5, each open end 16 of hairpin tubes 12 is present at frame member 44 adjacent injector nozzle 10. Because a metered dose of lubricant 14 is needed at each open end 16, injector nozzle 10, in addition to being movable along track 50, is also movable in a direction orthogonal to track 50 (i.e., injector nozzle 10 is movable in the z-direction in FIG. 5). To move injector nozzle 10 in a direction orthogonal to track 50, mounting block 54 may house a motor (not shown) that is operable to actuate injector nozzle 10 in the direction orthogonal to track 50. Specifically, injector nozzle 10 can be fixed to a support plate 58 that is actuated by the motor housed within mount block 54 to raise and lower injector nozzle 10 in the z-direction relative to track 50. Similar to motor 52, the motor housed within mount block 54 can be controlled by a controller (not shown) that is operable to run a control logic that takes into account the number and distance between support slots 18. Additionally, the controller for the motor housed within mount block 24 can take into account length of support slots 48, which allows the motor to raise and lower injector nozzle 10 the appropriate distance between upper and lower ends 60 and 62, respectively, of the support slots 48 to properly align injector nozzle 10 with open ends 16.

During operation, injector nozzle 10 may be actuated along track 50 in a first direction to provide a metered dose of lubricant 14 to each open end 16 of tubes 12 present at upper ends 60 of support slots 48. After a metered dose has been provided to each open end 16 present at upper ends 60 of support slots 48, injector nozzle 10 may be lowered and actuated in a second direction opposite to the first direction to provide a metered dose of lubricant 14 to each open end 16 of tubes 12 present at lower ends 62 of support slots 48. By providing lubricant 14 in such a back-and-forth manner, the productivity of injector apparatus 42 is substantially increased relative to a conventional fill and purge method. After a metered dose of lubricant 14 has been provided to each open end 16 of tubes 12, the lubricated tubes 12 are removed from injector apparatus 42 and replaced with un-lubricated tubes 12. The process may then repeat.

To provide lubricant 14 to each open end 16 of tubes 12, injector nozzle 10 is in communication with a lubricant reservoir 64 via a first hose 66. In addition, injector nozzle 10 is in communication with each of a compressed gas source 22 via a second hose 24 for actuating a valve (not shown) of injector nozzle 10 and an atomizing compressed gas source 26 via a third hose 28 that atomizes the lubricant 14 into ultra-fine droplets. Alternatively to using a compressed gas source 26 to atomize the metered dose of lubricant, injector nozzle 10 can be provided with a voltage source that, when applied, atomizes the metered dose of lubricant 14.

As noted above, it should be understood that injector nozzle 10 is preferably spaced apart from open ends 16 of tubes 12 during injection of a metered dose of lubricant. Spacing the injector nozzle 10 away from tubes 12 during injection of the metered dose of lubricant 14 provides for easier automation of injector apparatus 42. In particular, there is no need for a motor or controller that is operable to move injector nozzle 10 in and out of open ends 16 to inject the lubricant 14. Rather, injector nozzle 10 is only movable along track 50 (i.e., in the x-direction in FIGS. 5 and 6), and movable in a direction orthogonal to track 50 (i.e., in the z-direction in FIGS. 5 and 6).

Although injector nozzle 10 is spaced apart from tubes 12 during injection of the lubricant 14, injector nozzle 10 expels atomized lubricant 14 at a force sufficient to completely coat tubes 12. Even though tube 12 is completely coated with lubricant 14 after injection of lubricant 14 therein, however, the amount of lubricant 14 that is injected by injector nozzle 10 can be substantially less than that used during a conventional fill and purge method, while still achieving the beneficial aspects of expansion force, and proper shrinkage rate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for manufacturing a hairpin tube, comprising:
   cutting a length of tube from a coil of tube;
   forming a hairpin tube including a pair of legs from the length of tube;
   lubricating the hairpin tube with a metered atomized dose of a lubricant; and
   evaporating a solvent from the lubricant before expanding the legs of the hairpin tube.

2. The method of claim 1, wherein the metered atomized dose of the lubricant is injected into the hairpin tube with at least one injector nozzle.

3. The method of claim 2, wherein the injector nozzle is automated to successively lubricate a plurality of the hairpin tubes.

4. The method of claim 3, wherein the automated nozzle is maneuvered relative to the hairpin tubes.

5. The method of claim 2, wherein the injector nozzle is stationary.

6. The method of claim 5, wherein the step of lubricating the hairpin tube with the injector nozzle occurs as the hairpin tube moves past the stationary injector nozzle on a conveying device.

7. The method of claim 1, wherein the metered atomized dose of lubricant is a mist of lubricant droplets.

8. The method of claim 1, wherein the lubricant is atomized using compressed air.

9. The method of claim 1, wherein the dose includes 0.003 pounds of lubricant per pound of tube.

10. The method of claim 1, wherein the lubricant injected into the length of tube is injected at a force sufficient to completely lubricate an interior of the length of tube.

11. A method for manufacturing a tube, comprising:
    cutting a coil of tube to provide a plurality of lengths of tubes;
    atomizing a lubricant with an injector nozzle, and injecting the atomized lubricant into at least one open end of each length of tube; and
    evaporating a solvent from the lubricant before expanding each of the lengths of tube.

12. The method of claim 11, wherein the injector nozzle is stationary, and the lengths of tubes are conveyed past the injector nozzle during the injecting of the atomized lubricant.

13. The method of claim 11, wherein the injector nozzle is automated to move relative to the lengths of tubes to inject the atomized lubricant.

14. The method of claim 11, wherein the atomizing of the lubricant disperses the lubricant into a mist of droplets.

15. The method of claim 11, wherein the lubricant is injected into the length of tube in a predetermined amount.

16. The method of claim 11, wherein the lubricant injected into the length of tube is injected at a force sufficient to completely lubricate an interior of the length of tube.

17. The method of claim 11, wherein the lubricant is atomized using compressed air.

18. The method of claim 11, wherein the dose includes 0.003 pounds of lubricant per pound of tube.

* * * * *